United States Patent Office 3,447,063
Patented May 27, 1969

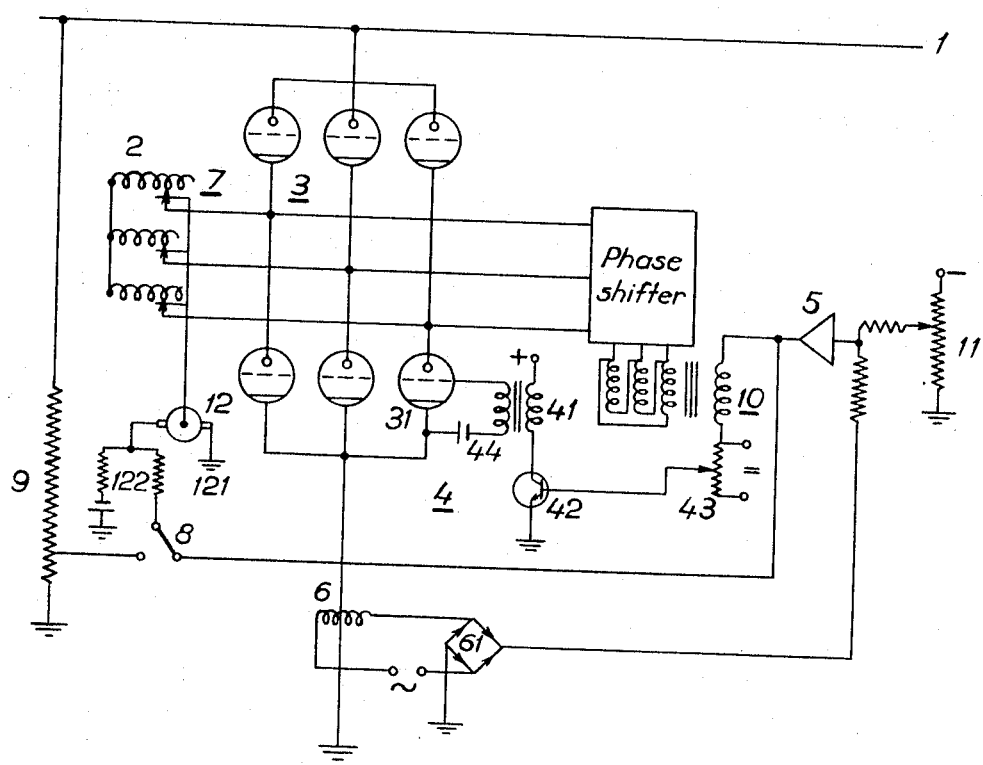

---

3,447,063
MEANS FOR CONTROLLING INVERTERS
Bertil Hammarlund, Ludvika, Sweden, assignor to Allmänna Svenska Elektriska Aktiebolaget, Vasteras, Sweden, a corporation of Sweden
Filed Jan. 24, 1967, Ser. No. 611,421
Claims priority, application Sweden, Jan. 24, 1966, 858/66
Int. Cl. H02m 7/52
U.S. Cl. 321—5        3 Claims

ABSTRACT OF THE DISCLOSURE

A static inverter station connecting a DC transmission line with an AC network and provided with a control regulator and an AC voltage control means. Said control regulator is provided for controlling the rectifiers of the inverter station through the grid control means of the rectifiers with respect to a predetermined value of a certain transmission magnitude. Said AC voltage control means is inserted between said AC network and the rectifiers of the station and is controlled from the output from said control regulator.

BACKGROUND OF THE INVENTION

Field of the invention

The present invention relates to the control of an inverter station in a high voltage direct current power transmission plant.

The prior arts

In a U.S. application Ser. No. 575,938, and now Patent No. 3,339,083 which is a continuation-in-part of application Ser. No. 266,319 is described the control for the alternating voltages on the AC sides of the rectifiers in a converter station which control can be made for instance by means of tap selectors on the converter transformers of the station. In one of the stations in a direct current transmission plant said control takes place with regard to a certain desired transmission direct voltage. In the other station—or if the plant comprises more than two stations, in the other stations—said control takes place with regard to a certain desired delay angle for the rectifiers of the station or a certain desired upper and lower limit for this delay angle. In such stations where the alternating voltage is controlled by the delay angle of the rectifiers, said control is in turn determined by a regulator controlled by a transmission magnitude, for example, the direct current transmitted. The result of the control will thus be that said regulator sets a certain delay angle in the control device in the converter, from which a magnitude depending on the delay angle is indicated to control the tap selectors of the converter transformers.

In a rectifier station said delay angle is a very good parameter for control of the tap selectors since in a rectifier station it is desirable for the delay angle normally to be kept above a certain minimum value so that in a particular situation it is possible to rapidly increase the direct voltage of the station by decreasing the delay angle below said minimum value.

On the other hand the delay angle should not become too great since the reactive power of the rectifier station increases with the delay angle. In practice it has been found that the delay angle in a rectifier station should preferably be held within the range 10–20° el. If the delay angle alters beyond said upper or lower limit a signal will be given to the tap selectors of the converter transformers causing them to decrease or increase, respectively, the alternating voltage connected to the rectifiers. In this way the direct voltage of the rectifier is altered and consequently its direct current, which in turn influences said regulator to alter the delay angle of the rectifiers in the desired direction so that the delay angle gradually returns to a value within said limits.

In an inverter station, however, it is not the delay angle, but the commutation margin which is decisive for the direct voltage (counter voltage) of the station and the reactive power, so that it is desirable to maintain the commutation margin in an inverter station within certain predetermined limits. In practice the limits for said commutation margin in an inverter should lie somewhere within the range 15–30° el. For a given commutation margin the corresponding delay angle for the rectifiers of the inverter is calculated taking into consideration the actual commutation voltage and commutation currents. There is thus no simple connection between delay angle and commutation margin in an inverter and the delay angle in an inverter is therefore not suitable as a parameter for controlling the tap selectors in the converter transformer of the inverter. These tap selectors should be controlled with respect to the desired upper and lower limits of the commutation margin. However, measuring or deriving said commutation margin in an inverter is rather complicated.

Summary of the invention

The present invention relates to the control of alternating voltage in an inverter where the delay angle for the rectifiers of the inverter is controlled by said regulator and the control of said alternating voltage is characterized in that the control device for the alternating voltage of the inverter is controlled by the output magnitude of the regulator.

It can be proved that, in an inverter, the relationship between said regulator magnitude and the commutation margin of the inverter follows at least approximately a simple function, so that if the tap selectors of the inverter transformer are controlled directly by the regulator, the same favourable results are obtained as if the inverter transformer were controlled directly with respect to a certain commutation margin in the inverter. According to the invention, therefore, a certain desired upper and lower limit should be chosen for the regulator magnitude, said tap selectors being influenced if the regulator magnitude alters beyond said limits.

Brief description of the drawings

The invention will be further described with reference to the accompanying drawing in which FIGURE 1 shows a DC transmission with an inverter station according to the present invention while FIGURE 2 shows the station II of FIGURE 1 in more detail.

Description of the preferred embodiment

Figure 1:
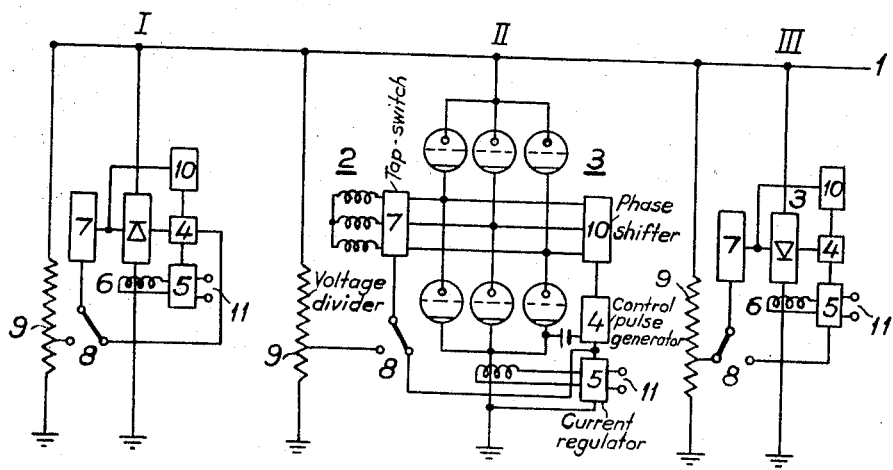

The drawing shows a DC transmission line 1, and between this and earth is connected a number of converter stations I–III. It is presumed that station I operates as a rectifier station while stations II and III operate as inverters. The reference numbers are the same in all three stations but only station II, which is an inverter station constructed in accordance with the invention, has been shown in more detail. Each station comprises a rectifier bridge 3 having six rectifiers, and this rectifier bridge is connected to an AC network through a converter transformer, of which only the rectifier winding 2 for station II is shown. The rectifiers and said rectifier winding are connected through a tap selector 7. For one of the rectifiers in the rectifier bridge a delay angle control device is provided comprising components 4, 5, 6 and 10. The components 5 and 6 are common for all rectifiers, but the device 10 is connected to a grid voltage device 4 in each of the six rectifiers. The device 10 is connected to the alternating voltage from the winding 2 and with the help of this device reference voltages are derived for each of the different rectifiers. These reference voltages, which are alternating voltages, are connected to the input side of individual grid voltage devices 4 in series with a direct voltage magnitude from a current regulator 5 for the converter station. The current regulator 5 is provided with input terminals 11 for the connection of an input magnitude by means of which a certain desired current value is set for the converter, and with the help of a transductor 6 on the DC side fo the converter, the current in the station is measured.

Each station is provided with a voltage divider 9 connected between the transmission line 1 and earth to measure the transmission voltage. In station III the direct voltage of the transmission is used to control the alternating voltage connected to the rectifier bridge 3, from the AC network (not shown) connected to the station, and this is done by controlling the tap selector 7 through the switch 8 by a voltage derived from the voltage divider 9. This control presupposes that station III is programme controlled, that is since it is an inverter station it is controlled so as to maintain a certain desired lowest commutation margin and the direct voltage (counter voltage) of the station will be substantially determined by the alternating voltage connected to the station.

The station I is controlled by its regulator 5 so as to maintain a certain desired transmitted direct current magnitude, for example a certain transmitted direct current and, depending on the current order connected to the terminals 11 in the regulator 5, control impulses having a certain delay angle will be emitted from the grid voltage device 4 to the rectifiers in the rectifier connection 3.

In station I the device 4 is shown as a block containing, besides the grid voltage device itself, a means for measuring said delay angle. This delay angle measurement is supplied to the tap changer 7 through the switch 8 to control the tap changer.

The inverter station II, like the rectifier station I, is controlled with regard to a certain desired transmitted direct current but, contrary to station I where the tap selector 7 is controlled by the delay angle of the rectifiers, the tap selector 7 in station II is controlled by the output voltage delivered from the current regulator 5 to the device 4 and connected through the switch 8 to the tap changer 7. As mentioned earlier, a simple method is thus obtained for maintaining the desired commutation margin for the rectifiers regardless of variations in the direct current of the station and in the alternating voltages connected to the rectifiers.

It is also seen from the drawing that the station III, controlling the direct voltage of the transmission, has its tap selector 7 controlled from the voltage divider 9 through the switch 8, while in the other stations, individually controlling their own transmitted current, the tap selector 7 in rectifier operation is controlled by the delay angle of the rectifiers and in inverter operation is controlled by the output voltage from the current regulator. Furthermore, it is seen that with the help of the switch 8 it is possible arbitrarily to choose which station is to be voltage determining for the transmission voltage and which stations are to control their own current. The only condition is that the control intervals indicated by the tap selectors of the converter transformers for the alternating voltages connected to the rectifier connections 3 are fairly alike. If, for example, the switches 8 in the stations II and III are reversed the tap selector setting in station III should be altered until an output voltage is obtained from the regulator 5 having a value lying within the limits indicated. Before the switching over of contact 8, the current measured by the transducer 6 in station III was higher than that set for the terminals 11 and the output voltage from the regulator 5 was therefore zero. When the contact 8 is switched over, therefore, the tap selector 7 will receive the control voltage zero and it therefore increases the alternating voltage connected to the rectifier connection 3. The direct current of the station is thus decreased due to the increased counter voltage and when the direct current measured by the transductor 6 tends to fall below that set for the terminals 11 and output voltage is obtained from the regulator 5 to restrain the inverter. When the output voltage from the regulator 5 has become so great that it is above the lower limit set, the tap selector 7 will stop in its position. In station II the tap selector will be controlled, after switching of the contact 8, with regard to a certain desired line voltage.

In FIGURE 2 the station II is shown more in detail. The reference numbers are the same as those in FIGURE 1.

The rectifiers of the station are controlled from a delay angle control means comprising the components 4, and 10. Here 10 is a voltage transformer the different phases of which are fed from the proper commutation voltages of the rectifiers through the phase shifter. 4 is a grid control pulse generator. Said grid control pulse generator is in its turn controlled from a control regulator comprising a regulator amplifier to the input side of which is connected a presetting circuit 11 and a DC measuring means 6.

The control pulse generator 4 for the rectifier 31 comprises a grid voltage transformer 41 the secondary side of which is connected to the grid and the cathode of the rectifier in series with a negative bias voltage source 44. The primary side of the grid voltage transformer is connected between a positive voltage source and earth in series with a transistor 42 the base electrode of which is connected to a direct bias voltage from a potentiometer 43. An AC reference voltage is taken out from a secondary phase winding of a voltage transformer 10 connected to the transformer winding 2 through a phase shifter. Said secondary phase winding of the transformer 10 is connected to the output side of the regulator 5 which is constituted by an amplifier.

To the input side of said amplifier is connected the output from a potentiometer 11 and the output from a rectifier bridge 61 connected to the measuring transductor 6. Thus a certain desired direct current value for the station can be preset on the potentiometer 11 and the difference between the output from the potentiometer and the output from the rectifier bridge 61 corresponding to the actual direct current of the station is fed to the amplifier 5 giving an output signal corresponding to said difference. When the sum of the output from the amplifier 5 and the secondary phase voltage from the transformer 10 and the bias voltage from the potentiometer 43 becomes positive, the transistor 42 becomes conducting and a current flows in the primary of the grid voltage transformer 41 inducing a voltage in the secondary of said transformer, said voltage exceeding the bias voltage 44 and thus making the rectifier 31 conducting with a certain delay angle in relation to the alternating voltage fed to it.

Said delay angle gives the direct voltage of the station and the difference between this direct voltage and the direct voltage of the transmission line 1 gives the direct current of the station. This direct current gives a signal to the amplifier 5 which gives a signal to the grid voltage device 4 which in its turn gives the delay angle of the rectifiers and thus the direct voltage of the station and a balance is obtained when the output from the rectifier bridge 61 is approximately the same as that from the potentiometer 11.

The transformer winding 2 is provided with a tap selector 7 operated by a motor 12 having a control circuit 121 connected to the switch 8 at the one end and having a bias voltage 122 at the other end.

If the signal from the amplifier 5 is equal to the bias voltage 122 the motor 12 will stand still. If the setting of the potentiometer 11 is changed or if the direct voltage of line 1 changes, the input signal to the amplifier 5 will change and then the output signal from this amplifier will change and correct the delay angle for the rectifiers until a new point of balance is obtained. Now the signal from the amplifier will be different from the bias voltage 122 and the motor will rotate in one or the other direction, thereby adjusting the tap selector 7 and thus the alternating voltage connected to the rectifiers 3. Owing to this the direct voltage of the inverter station and then also the direct current of this station is changed so that the signal from rectifier 61 is changed. After a while therefore the adjusting of the tap selector 7 causes the original output signal from the amplifier 5 to be restored.

As in FIGURE 1 the switch 8 can be moved to the left so that the motor 12 and the tap selector 7 are controlled by the line voltage taken out from the voltage divider 9 instead of from the output from the regulator 5.

The parts 5, 6, 11 constitute a control regulator means which is connected both to the delay angle control means 4, 10 and to the AC voltage control means 7, 12.

The control regulator, the AC voltage control means, the rectifiers and the delay angle control means form together a closed control loop. The control regulator means controls the AC voltage control means in such a way that the output from the control regulator means is kept substantially constant.

I claim:

1. In an HVDC power transmission plant comprising a DC power transmission line and at least three stations connected to said line in parallel to each other; at least one of said stations being a rectifier station; at least one other of said stations being an inverter station connected to one side to said DC power transmission line and on the other side to an AC network and including rectifiers, said inverter station having delay angle control means for said rectifiers, control regulator means responsive to variations in the direct current in said inverter station and to the voltage in said AC network to regulate said delay angle control means so as to maintain said direct current substantially constant, AC voltage control means in the connection between the inverter station and said AC network, said control regulator means including means to regulate said AC voltage control means, said control regulator, said AC voltage control means, said rectifiers and said delay angle control means forming together a closed control loop; said control regulator regulating said AC voltage control means in such a way that the output from said control regulator is maintained substantially constant.

2. In a plant as claimed in claim 1, having a converter transformer in the connection between the inverter station and the AC network, said AC voltage control means including tap selector means on said converter transformer and means to adjust said tap selector means.

3. In a plant as claimed in claim 2, a member having a voltage proportional to the voltage in said DC line, and means for selectively connecting said AC voltage control means to said control regulator means and to said member.

References Cited

UNITED STATES PATENTS

| 3,270,270 | 8/1966 | Yenisey | 321—18 |
| 3,293,531 | 12/1966 | Dortort | 321—16 |
| 3,304,486 | 2/1967 | Michaels | 321—18 |
| 3,329,883 | 7/1967 | Frierdich | 321—5 |
| 3,356,928 | 12/1967 | Parrish | 321—18 |
| 3,364,412 | 1/1968 | Sauter | 321—5 |
| 3,375,427 | 3/1968 | Magner et al. | 321—5 |

JOHN F. COUCH, *Primary Examiner.*

W. M. SHOOP, Jr., *Assistant Examiner.*

U.S. Cl. X.R.

321—18, 27